INVENTORS
PIERRE M. LUCAS & JEAN F DUQUESNE
BY
Abraham A. Saffitz
ATTORNEY

FAST ACCESS SYSTEM TO MAGNETIC DRUM MEMORIES

Filed July 29, 1964

3 Sheets-Sheet 2

INVENTORS
PIERRE M. LUCAS & JEAN F. DUQUESNE
BY
Abraham A. Saffitz
ATTORNEY

FAST ACCESS SYSTEM TO MAGNETIC DRUM MEMORIES

Filed July 29, 1964 3 Sheets-Sheet 3

INVENTORS
PIERRE M. LUCAS & JEAN F. DUQUESNE
BY
Abraham A. Saffitz
ATTORNEY 3,332,070
FAST ACCESS SYSTEM TO MAGNETIC DRUM MEMORIES Pierre M. Lucas, 20 Rue Henri Tariel, Issy-les-Moulineaux, France, and Jean F. Duquesne, 41 Rue Esquiral, Paris, France Filed July 29, 1964, Ser. No. 385,999
Claims priority, application France, July 31, 1963, 943,382
3 Claims. (Cl. 340—172.5)

ABSTRACT OF THE DISCLOSURE

Access system from a computer to a magnetic drum memory in which words are stored in storage positions each having a sector address and a track address, comprising an intermediate fast access memory inserted between the computer and the magnetic drum memory and also comprising storage positions for the words, the track addresses thereof and the instruction, write-in or read-out, applied thereto, the storage positions of the intermediate memory respectively corresponding to the sector addresses of the magnetic drum memory. Means are provided for successively transferring from the intermediate memory storage positions into the magnetic drum memory storage positions and vice-versa, the words forming a series of words having sector addresses differing by an integer less than the total number of sector positions and having no common divisor therewith and there are means for allowing said transfer to continue even in the case where no word is to be transferred at a given sector address of the series.

This invention relates to a system for access to long access memories, more particularly to a system for access to a magnetic drum memory, having a faster access time than an associated magnetic drum.

In many automatic centralized control systems, such as electronic or semi-electronic automatic telephone selectors, it is known for a computer to be associated with memories whose structure depends upon the particular kind of data which the computer is required to process. In the particular case of an electronic automatic switching network, the data to be stored can be broken down into four groups:

(a) The permanent instructions which make up the computer program;

(b) The data making up the repertory—i.e., the various translation tables—which are semipermanent data;

(c) Subscribers' billing data, which are temporary data, and (d) Data, which are likewise temporary, provided by telephone register and marker means about the state of calls which are actually being trunked.

Conveniently, the memory structure should be adapted to the particular kind of data which the memory is required to store. For instance, program instructions (a) never in theory have to be amended and can be stored in a permanent wired memory requiring manual intervention for any changes. The list or repertory (b) covers data which require amending only if there is a change in the structure of the exchange or of the line network, and so the repertory or list can be stored in a semi-permanent memory which is fairly easy to amend, such as a magnetic drum. The billing data (c) and, of the data (d), those defining the phase of the actual call, can, with advantage, be stored in a temporary memory which can readily be amended but which need not have a very fast access time. As with case (b), a slow temporary memory such as a magnetic drum is suitable. However, data under (d) from registers recording dialling signals must, more particularly, if a high-capacity automatic selector switch is used, be stored in a fast temporary memory such as a ferrite ring memory.

Of course, just a single kind of fast temporary memory can be used to record type (b), (c) and (d) data, but this is not an economical idea since the stored binary digit or bit, for instance, of a ferrite ring memory costs more than the binary digit of a magnetic drum memory. Economically, therefore, it is advantageous to use magnetic drum memories for as many bits as possible.

Unfortunately, one disadvantage of magnetic drum memories is the long mean access time required to reach a data item with a random address. This mean access time is equal to the time taken for the drum to perform half a revolution and is, for instance, same 10 milliseconds with conventional magnetic drums.

More particularly, in the conventional method of using a magnetic drum, it is associated with: a data register which can contain a word to be written-in or receive a word to be read-out; two address registers, one for track addresses and one for angle or sector addresses; and a system of logical circuits adapted to gate the word written into the data register to that zone of the drum whose track and sector addresses are written into the address registers or to gate the word written into the last-mentioned zone to the data register. The drum as it rotates arcuates an actual-sector-position register, and a sector-address-comparator continuously compares the actual-sector-position of the drum with the desired sector-address. Upon coincidence occurring between the actual and desired items, the comparator transmits a signal to a track selector and to the data register. The track selector connects the data register to the head associated with that particular track whose address had been written into the track-address register, whereafter the write-in or read-out gating is performed bit by bit.

In the conventional organisation just described, the data flow—i.e., the number of words transferred per unit of time—between the data register—or, more generally, the data source, possibly a computer—and the magnetic drum is limited by the mean access time if—as is the usual case—the words to be transferred have random addresses. The reason for this is that, on the average, the drum performs half a revolution between the time when it receives an order and the time when the order is carried out, and during the time corresponding to this half revolution the drum is not available for any further orders since it can accept only one order at a time. Consequently, if the drum capacity is $n$ words per revolution and per track, the data flow is 2 words per revolution, but the theoretically possible maximum data flow—assuming zero switching time between two tracks—is $n$ words per revolution and the maximum data flow which is possible in practice, assuming that the time taken to switch between two tracks is substantially equal to the time required to write-in or read-out one word—can be taken as $n/2$ words per revolution.

Attempts have been made to decrease the access time to magnetic drums. Information storage magnetic drums are known which have plural storage positions to store both program instruction information and data information in preselected spatial relationship in succeeding storage positions and which permit the selection solely by spatial relationship, in succession, of each instruction of the program and its related data information for data processing. In these magnetic drums the data words have preselected storage positions depending upon the program to be performed; the programs must be unconditional programs with fixed allocated steps and the data have predetermined addresses. Such magnetic drums cannot be used in information storage calculation systems in which the programs are conditional programs or unconditional programs the steps of which interlace at random with each other; in these cases, the addresses of the words to be processed are random addresses and not predetermined addresses.

Other access devices to a principal long access memory are already known in the art which comprise a buffer short access memory. In the principal memory, a magnetic drum memory for example, the word storage spots are defined by two coordinates or addresses, a sector address and a track address; in the buffer memory, a magnetic core matrix memory for example, the word storage spots are defined by one coordinate only, their sector address regardless of their track address, but the word track addresses are written next to the words themselves. Thus each word storage spot in the buffer memory may correspond to an integral number of word storage spots in the principal memory, those which in each track have the same sector address.

In said devices, the contents of a spot in the short access memory are repetitively presented to a comparator simultaneous with the sequential presentation thereto by the long access memory of the corresponding track spots. Entries of input information from one or more input devices are stored in the short access memory spots corresponding to the long access memory spots for which the entries are intended; each entry then remains temporarily in the short access memory until its predetermined long access memory spot is accessible. Thus the entry in the buffer memory is quite fast but the transfer into the principal memory which results from a scanning of the same is rather long.

The object of the invention is to provide a system for access to a magnetic drum, of a kind such that the data flow between an information source in the form of a computer and the magnetic drum is very much greater than the average 2 words per revolution for random addresses.

In general, the magnetic drum access system of the invention comprises a fast buffer memory divided into a number of word storage positions or spots which are to the same number as, and correspond to, the word positions or spots of a track of the magnetic drum, and each word which may experience a transfer order (write-in or read-out) in respect of the magnetic drum is first transferred, with the order relating to it and with its track address, to the fast buffer memory. Thus, the buffer memory gets in a supply of words when the drum has implemented an order concerning a word whose sector address is $j$, the drum then systematically and consecutively implements the orders concerning the words whose sector addresses are $(j+k)$, $(j+2k)$, $(j+3k)$ and so on where $k$ is an odd number less than $n$ and has no common divisor therewith, the order, the track address and—in the case of a write-in—the words itself being extracted from the sector spots of the fast buffer memory having the same sector addresses $(j+k)$, $(j+2k)$, $(j+3k)$ and so on. The data flow then becomes $n/k$. For instance, if $n=128$ and $k=7$, the data flow is 18.3 words per revolution as compared with the 2 words per revolution of the prior art access systems. In short, therefore, random addressing is performed in the fast buffer memory and the magnetic drum operates with a nordered addressing.

The data source, such as a computer, can perform two programs: a "normal" program, using the fast buffer memory or possibly other fast memories, and a work program with the magnetic drum. After each transmission of an order thereto, the normal program operates, to cease upon termination of implementation of such order in order that the word which may be read out may be used.

A detailed description will now be given of the invention with reference to the accompanying drawings wherein.

Figure 1:
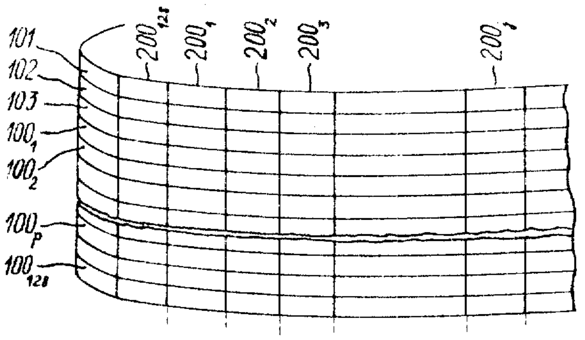
FIG. 1 shows how word spots are arranged in a conventional magnetic drum.

Referring to FIG. 1, it is assumed that a drum 1 comprises 128 data tracks numbered from $\mathbf{100}_1$ to $\mathbf{100}_{128}$ and 128 sectors numbered from $\mathbf{200}_1$ to $\mathbf{200}_{128}$, so that there are 128 x 128 recording areas, or spots into each of which a word comprising 32 bits can be written. It will be assumed that the bits forming the words are in series on the tracks. A spot or the 32-bit word to be written thereinto or removed therefrom is defined by a track address $p$ and a sector address $j$. Also, three auxiliary tracks numbered 101, 102, 103 deliver one pulse per drum revolution, one pulse per sector and one pulse per bit position, respectively.

Figure 2:
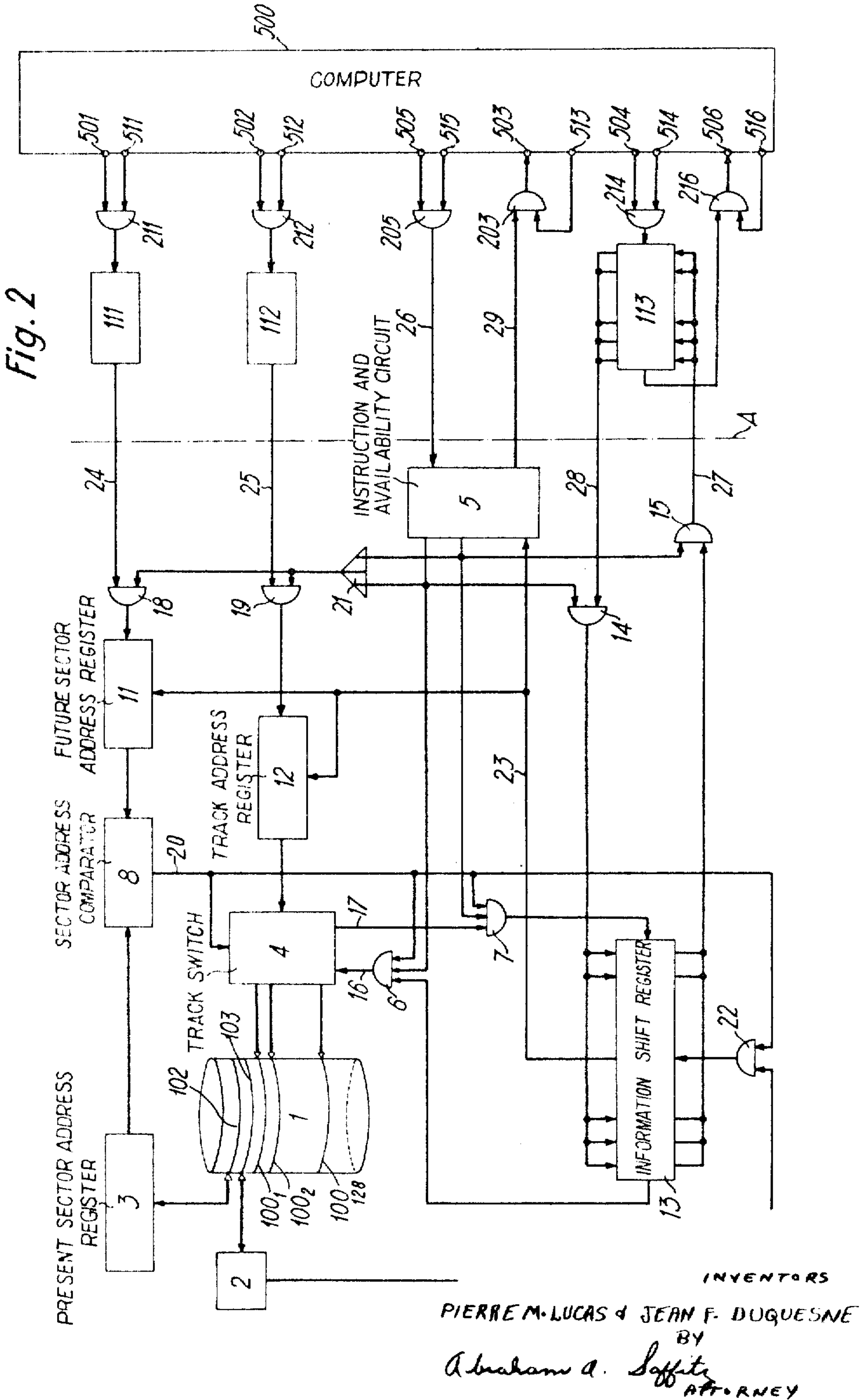
FIG. 2 shows a conventional access system for a magnetic drum.

A description will now be given with reference to FIG. 2 of a typical prior art organization for giving a computer access to a magnetic drum, the same being of the conventional kind described with reference to FIG. 1. In FIG. 2, a magnetic drum 1 controls via its track 103—which, as already stated, produces one pulse per bit position—a time base 2, while via its track 102—which as already stated, delivers one pulse per sector—it controls an actual-sector-position register 3. The heads which cooperate with the data tracks are connected to a track switch 4.

An order and availability circuit 5 shows whether the order given by the computer to the drum 1 is a write-in order or a read-out order. The circuit 5 can comprise, for instance, two triggers—a write-in trigger and a read-out trigger—which are selectively controlled via terminal 505 of computer 500 in accordance with the computer program and which, in dependence upon their condition, prepare either the opening or the closing of two gating circuits 6, 7 which enable a data item either to reach the drum via a line 16 or to leave the drum via a line 17. When the two triggers of the circuit 5 are both in the normal condition, the circuit 5 is avialable or free. When either of the triggers is in operation, the circuit 5 indicates that it is busy. The circuit 5 is connected to the terminal 503 of the computer 500 and the same tests the state of the terminal 503—i.e., checks drum availability—before sending a write-in or read-out order to the drum.

A sector address-register 11, a track-address-register 12 and a data shift register 13 are associated with the drum 1. The registers 11, 3 are connected to a sector-address-comparator 8 which continuously compares the desired sector address written into the sector-address-register 11 with the actual angular position of the drum 1 as written into the actual-sector-position register 3, the comparator 8 producing a signal on a line 20 in the event of coincidence between the desired sector address and the actual angular position of the drum 1. Such signal controls the positioning of the track switch 4 and the opening of the gating circuits 6, 7. The sector-address-register 11 is connected in parallel to a sector-address-register 111 of the computer 500 via a gating circuit 18 controlled via an or-gate 21 by the order and availability circuit 5.

The track-address-register 12 is connected to the track switch 4 which is merely a decoder. Switch 4 connects the lines 16, 17 to whichever write-in and read-out head co-operates with the track whose address has been written into the track-address-register 12. The same is connected in parallel to a track-address-register 112 of the computer 500 via a gating circuit 19 controlled via an or-gate 21 by the order and availability circuit 5.

The data shift register 13 can transmit its data serially to the drum 1 through the gating circuit 6 and the track switch 4 and receive data serially from the drum 1 via the track switch 4 and the gating circuit 7. The step-by-step advance of the register 13 is controlled by the time base 2 through an and-gate 22 opened by the sector-address-comparator 8 via the line 20. The register 13 is connected in parallel to a data register 113 of the computer 500 by two connection systems, one of which helps to gate data from the register 13 to the register 113 and which extends via the gating circuit 15 opened by the circuit 5 in the read-out position, while the other helps to gate information from the register 113 to the register 13 and extends by the gating circuit 14 which is opened by the circuit 5 in the write-in position.

Via a line 23 the shift type data register 13 controls the reset of sector-address-register 11 and track-address-register 12 and the return of circuit 5 to its availability position.

The circuit forming part of the organization shown in FIG. 2 need not be described in detail since a number of typical structures of each circuit are known in the art. For instance, the zero-resetting control means operated by the register 13 can take the form either of a pulse counter which delivers a pulse when all the memory stages of the register have been filled or emptied or of a coincidence circuit which is connected to all the memory stages of the register and which delivers a pulse whenever all such stages simultaneously contain zeroes.

A brief reminder will now be given of how the prior art magnetic drum access system operates.

To make it easier to understand the invention which will be described subsequently, each terminal 501–506 of the computer 500 is associated with a second terminal 511–516 respectively and with a respective and-gate 211–216. The terminals 511–516 are for opening the circuits 211–216—i.e., for opening the gating path of the order contents—and the terminals 501–506 are for transmitting or receiving the order contents.

After opening the gating circuit 203 via the terminal 513, the computer 500 tests for drum availability via the terminal 503. If the drum is free, it or, more accurately, the order and availability circuit 5 receives a write-in or read-out order via the terminal 505. This order brings the circuit 5 into the busy state (so that no further order can be transmitted until the pending order has been implemented), and opens the gating circuits 18, 19, 14 in the case of a write-in order and 18, 19, 15 in the case of a read-out order. The addresses present in the sector-address-register 111 and track-address-register 112 are transferred to the sector-address-register 11 and track-address-register 12; in the case of a write-in order, the data present in the register 113 is transferred to the register 13, while in the case of a read-out order the register 13 awaits data from the register 13.

When the required sector address is gated to the sector-address-register 11, the comparator 8 provides a continual comparison of the actual angular position of the drum with the required address. When the said actual angular position coincides with the required sector address, a signal appears on the line 20 and opens that of the gating circuits 6 or 7 whose opening has previously been prepared by the circuit 5 (only one of these gating circuits can be prepared at a time) and positions the track switch 4. For a write-in, the data present in the data shift register 13 is transferred bit by bit to the required address spot on the drum, while for a read-out the data present at the required address spot of the drum is transferred bit by bit to the register 13. Once all the data has left the register 13 (write-in) or has been recorded in the register 13 and transferred in parallel to the register 113 (read-out), the order and availability circuit 5 and the sector-address-register 11 and track-address-register 12 are reset to zero via line 23, whereafter the availability signal reappears. In the event of the computer making another test on the now free terminal 503, the terminal 505 can accept a fresh order.

As explained in the opening part hereof, the mean rate of the drum system of the prior art kind described with reference to FIG. 2 is at best equal to the inverse of the duration of half a revolution of the drum, since the data is stored, prior to its transfer into the drum, in a data register containing only a single word and this word has a random (sector and track) address.

According to the invention, a fast buffer memory is added to the magnetic drum or, if the automatic system comprising the same already has a fast memory, the capacity thereof is increased in order that the same may partly form the buffer memory.

The fast buffer memory (or that part of the existing fast memory which acts as buffer memory) which co-operates with the magnetic drum comprises two lines $300_1$, $300_2$ and as many columns $400_1$ to $400_{128}$ as the drum has sectors. The fast buffer memory defines along the line $300_1$ 128 storage spots into each of which a 32-bit word can be written, while on the line $300_2$ the fast buffer memory defines 128 storage spots for address and order data concerning the word written into the same column in the line $300_1$. So far as words are concerned, therefore, we can say that the fast buffer memory comprises only 128 spots whose numbers $j$ correspond one by one to the number $j$ of the spots of the magnetic drum.

There is a correspondence between a pigeon-hole or spot of the column $j$ of the fast buffer memory and the pigeon-hole disposed at the intersection of the sector $j$ of the magnetic dum with the track whose number has been written into the pigeon-hole of the column $j$. More particularly, the words to be written into the sector $j$ of any of the tracks of the magnetic drum are stored for write-in in the column $j$ of the line $300_1$, and the track into which they are to be written is written into the column $j$ of the line $300_2$, the same also comprising, as will be seen hereinafter, a data item to denote that a write-in is going on. Similarly, the words which are read-out in the sector $j$ of any track of the magnetic drum are stored after read-out in the column $j$ of the line $300_1$, the track into which they have been read-out being written into the column $j$ of the line $300_2$, the same also comprising a data item to denote that a read-out is going on.

Figure 3:
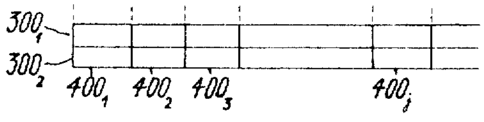
FIG. 3 shows the relationship between the spots in the fast buffer memory and the spots in the magnetic memory.
Figure 4:
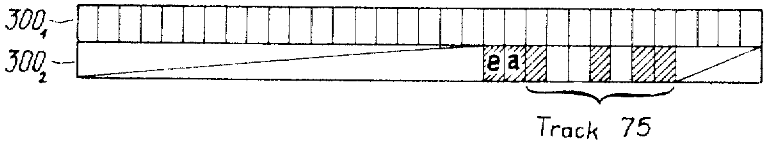
FIG. 4 shows the details of a spot of the fast buffer memory.

FIG. 3 shows the fast buffer memory and FIG. 4 shows one pigeon hole thereof. The same comprises 32 bit places along the line $300_1$ and two bit places $e$, $a$ along the line $300_2$ for storing an order data item (write-in or read-out; see the order code to be described hereinafter), and seven bit places for recording a track number. Assuming that the pigeon hole shown in FIG. 4 is the pigeon hole of the column $400_{98}$ and that the white positions of the pigeon hole contain zeroes and the hatched positions of the pigeon hole contain ones, the word stored in the line $300_1$ of the buffer memory pigeon hole is to be written into that pigeon hole of the magnetic drum which is disposed at the intersection of the track $100_{75}$ with the sector $200_{98}$.

Instead of writing-in or reading-out words appearing consecutively with random addresses, the magnetic memory hunts in a specific address order for the words previously written into the buffer memory at an increased rate.

Figure 6:
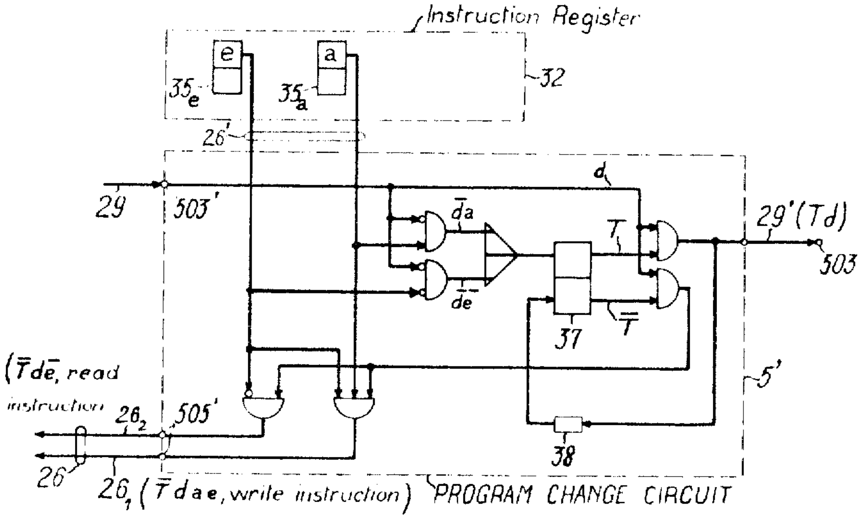
FIG. 6 shows the program-changing circuit.
Figure 5:
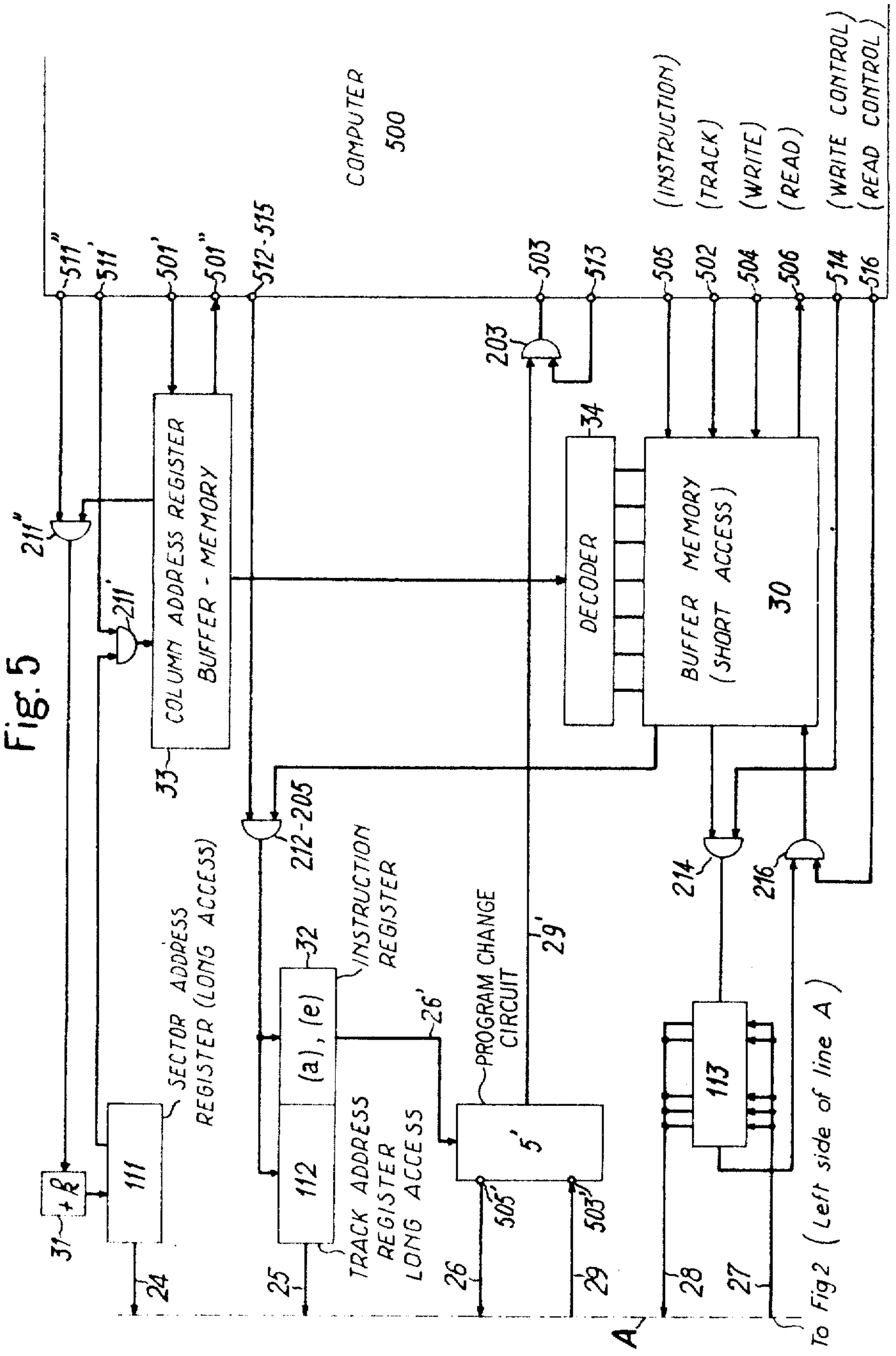
FIG. 5 shows the improved magnetic drum access system according to the invention.

Referring now to FIG. 5, in which elements or circuits identical to those of FIG. 2 have like references, we again find a sector-address-register 111, a track-address-register 112, a data register 113, but we find further a program change circuit 5' which will be described in detail with reference to FIG. 6 and which comprises a terminal 505' for indicating the kind of order transmitted to the drum, and an availability terminal 503'. At fast buffer memory 30 is associated with a column address register 33 enabling the memory columns to be designated by means of a decoder 34.

The fast buffer memory 30 can receive data from the computer 500, such data being mainly those shown in FIG. 4, and is adapted to record such data at the column addresses designated by the computer (as will be recalled, the column addresses of the buffer memory correspond to the drum sector addresses). Conversely, the computer can interrogate the fast buffer memory and obtain the contents of a word stored at a predetermined column address. These data exchanges between the memory 30 and the computer 500 can be performed at arbitrary times at the computer's request and can refer to completely random addresses—i.e., to addresses which are neither sequential nor related to the actual angular address of the drum and are determined only by the normal program of the computer.

To this end, the computer 500 has access via its terminals 501′, 501″ to the colunm-address-register 33 and can either have the address stored therein transferred to it via the terminal 501″, for instance, for temporary storing elewhere said address or transfer any address to the register 33 via the terminal 501′. The computer 500 also has access to the memory 30 via instruction terminal 505, track designation terminal 502, data write-in terminal 504 and data read-out terminal 506. The buffer memory 30 and its address register 33 communicate with the registers 111–113 hereinbefore defined and which are associated with the computer 500.

The register 33 communicates with the sector-address-register 111, such register having the same function as the register of like reference in FIG. 2. The connection between the registers 33, 111 is such that the contents of the register 111 can be transferred to the register 33, with erasure of the initial contents of the register 33 but without subsequent erasure of the contents of the register 111, via a gating circuit 211′ controlled by terminal 511′, while the contents of the register 33, plus $k$ units, can be transferred to the register 111, with erasure of the initial contents of the register 111 and without subsequent erasure of the contents of the register 33, via a gating circuit 211″ controlled by a terminal 511″, the addition of $k$ units to the contents of the register 33 being effected in an adding circuit 31.

If the computer, having had the contents of register 33 transferred to it via terminal 501″ in order to store elsewhere the address formed by contents, sequentially controls the opening of the gates 211′ then 211″, the address initially present in the register 111 is transferred to the register 33 whence it can be used to denote the corresponding column of the memory 30, then returns, plus $k$ units, to the register 111. When the computer uses this feature at favourable times such as will be described hereinafter, the buffer memory contents having the same sector address $j$ as the spot which presently passes below the drum heads can be transferred into said spot, whereafter the contents of the register 111 can be used to designate that sector address of the drum to which the next order will refer—i.e., the order having the sector address $(j+k)$. Upon the completion of these operations, the computer 500 can restore to the register 33 the address which was initially present herein and which has been provisionally stored in another register of the computer, by gating such address via the terminal 501′, and can also introduce any arbitrary address which it wants to into the register 33.

The computer 500 also has access to the buffer memory 30 via the terminal 504, via which a data item prepared by the computer can enter the memory 30, and via the terminal 506, via which data read-out in the buffer memory can be transferred to the computer. Via the terminal 505, the buffer memory receives read-out or write-in orders for a word whose column address is given by the actual contents of the register 33 and whose data contents are transmitted via the terminal 504 or 506, depending upon the particular case concerned. The track address of such word is transmitted to the buffer memory via the terminal 502.

Via terminals 512, 515 and gating circuits 212, 205, the computer controls the gating of a track address and an associated instruction read-out in the memory 30 in a pigeon hole $300_2$ (FIG. 4) to the track address register 112 and to the instruction register 32; via terminal 514 and gating circuit 214, the computer controls the gating of a data item read-out in a pigeon hole $300_1$ of memory 30 to the data shift register 113, and via terminal 516 and gating circuit 216 the computer control transfers in the opposite direction from the data shift register 113 to a pigeon hole $300_1$ of the memory 30, in the column $j$ designated by the address contained in the register 33.

The instruction register 32 has two triggers $35_e$, $35_a$ which record the state of the binary elements $e$, $a$ respectively of the pigeon hole $300_2$. The binary digits $a$, $e$ recorded in the fast buffer memory denote instructions to be performed as follows:

| | | |
|---|---|---|
| $a=1$ | $e=1$ | write-in instruction |
| $a=1$ | $e=0$ | normal readout instruction |
| $a=0$ | $e=0$ | ineffective read-out instruction |
| $a=0$ | $e=1$ | unused combination |

The purpose of the read-out instruction is the following. As explained, the buffer memory gets in a supply of words together with the associated track addresses thereof and the instruction, write-in or read-out, applied thereto all at a fast rate. Then the magnetic drum deals cyclically with the words stored in the buffer memory. It may occur that a pigeon hole actually being scanned contains no write-in nor read-out instruction. In order that the magnetic drum access system may continue the $k$ by $k$ scanning of the fast buffer memory, this case leads to the normal kind of read-out instruction, but steps are taken to prevent the read-out from being used by the computer.

The program change circuit 5′ receives a signal $d$ via the availability line 29 when the drum is free, and receives a signal $\bar{d}$ when the drum is busy, and receives, via line 26′, two of the following four signals—$a$, $\bar{a}$, $e$, $\bar{e}$—i.e., the conditions of the two triggers of the instruction register 32 denoting the instruction to be implemented by the drum. The circuit 5′ comprises a trigger 37 which is in the one state denoted by T, when it simultaneously receives $\bar{d}$ and either $a$ or $\bar{e}$. In other words, this trigger indicates that a write-in instruction (denoted by $a$) or a read-out instruction or an ineffective read-out instruction (denoted by $\bar{e}$) has been sent and caused the availability signal to disappear from the line 29. Also, the program-changing circuit transmits the write-in instructions $\bar{T}.d.a.e$ to line $26_1$, the read-out instructions $\bar{T}.d.\bar{e}$ to line $26_2$, and the normal program interruption instruction $T.d$ to line 29′ and terminal 503. As will be apparent, therefore, the trigger 37 operates whenever any instruction is sent to the magnetic drum and cancels the availability thereof ($\bar{d}\ a$ and $\bar{d}\ \bar{e}$ conditions). Operation of the trigger 37 enables the computer 500 to resume its normal program. When the magnetic drum has implemented its instruction and the signal $d$ appears on the line 29 and at the terminal 503′, the normal program interruption instruction is sent to the transmitter in order that the same may have some time available to process the word just read out (in the case of a read-out). The signal $T.d$ resets the trigger 37 to zero with a delay produced by a delay circuit 38. Of course this zero resetting can be effected by the computer at the end of the treatment program of the word concerned.

Taking as the initial time the time when the computer 500 receives a normal program interruption signal at its terminal 503, the procedure can be described as follows:

Since this initial time corresponds to the time when the drum has just finished its passage on the word whose sector address $j$ was stored in the register 111 and whose track address $p$ was stored in the register 112, the register 113 contains at this time the starter data item which has been read out from (or written into) the drum.

The computer interrupts its normal program, possibly stores the contents of the register 33 via the terminal 501″, and acts via its terminal 511′ to gate the address $j$ from the register 111 to the register 33, with the result that, through the agency of the decoder 34, the read-out and write-in operations in the memory 30 are directed towards the pigeon holes or spots $\mathbf{300_1}$, $\mathbf{300_2}$ of the column $\mathbf{400_j}$ of address *j*.

The computer notes the contents of spot $\mathbf{300_2}$ via read-out terminal 506—i.e., the former order just implemented by the drum to determine from the elements *a* and *e* whether the operation is a write-in or a read-out. In the latter event, the computer introduces the results of drum read-out into the memory 30 via the read-out control terminal 516, whereafter the computer can have such result transferred to itself via the read-out terminal 506 either immediately or subsequently.

The computer then advances the sector address *j* by *k* units in the registers 111 and 33 by acting sequentially on the controls 511″, 211″ and 511′, 211′. Consequently, the decoder 34 directs the read-out circuits of the memory 30 to the spots $\mathbf{300_1}$, $\mathbf{300_2}$ of the column $\mathbf{400_{(j+k)}}$ of rank $(j+k)$—i.e., to those spots which possibly contain the order for transmission to the drum.

Through the agency of the terminals (512–515), (212–215) and 514–214, the computer gates any data contained by the spot $\mathbf{300_1}$ to the data register 113 and gates the contents of the spot $\mathbf{300_2}$ to the track address register 112 in respect of a track address and to the instruction register 32 in respect of the binary elements *a*, *e*. If the memory spot $\mathbf{300_{1-2}}$ of address $(j+k)$ is empty (if $a=0$ and $e=0$), this means that the drum receives an ineffective read-out instruction. Since the drum availability signal *d* is at this time present at the terminal 503′ and the trigger 37 is in the normal condition, the instruction written into the register 32 is transmitted to the drum via the terminals 505′ and the lines $\mathbf{26_1}$ or $\mathbf{26_2}$, depending upon whether the instruction is for a write-in or a read-out. Since the register 111–113 are filled in, the drum has all the elements necessary for performing this instruction. Once the instruction and availability circuit 5 of the drum has recorded the instruction, matters proceed conventionally; more particularly, the availability signal *d* disappears from the terminal 503′ so that the trigger 37 is operated—i.e., the transmission of the order to the drum is interrupted.

The computer can now resume its normal program while waiting for the word of rank $(j+k)$ to pass below the drum heads and for the circuit 5 to restore, after implementation of the instruction, the availability signal to the terminal 503′; once this occurs, and since the trigger 37 is now in operation, the program interruption signal appears on the line 29′ and the terminal 503.

As it performs its normal program the computer can supply the memory 30 with the various instructions which it can prepare for the drum without any consideration of the actual sector address, the only precaution needed being to check beforehand that the various spots where it is required to write the order in are available.

These operations are performed by the computer by acting, as already stated, on the terminals 501′, 501″ for the sector addresses, 502 for the track addresses, 504, 506 for the data, and 505 for giving the read-out or write-in orders.

Of course, many variants of details, which the engineer in the art can readily devise, can be made to the system hereinbefore described and all fall under this invention. For instance, the manner (series or parallel) in which the transfers between the various registers and memories are made is of no importance for the invention, and only the write-in into and the read-out from the magnetic drum need to be serial.

What we claim is:

1. In an electrical digital computer including a source of electrical signals representing data items to be operated upon, a principal magnetic drum memory divided into a plurality of tracks and a plurality of *n* sector positions per track, one sector position for each data item, whereby said data items are identified by sector and track addresses, a sector address register, a track address register and a data register associated with said principal magnetic drum memory, a fast access data transfer system, said system comprising an intermediate fast access memory divided into a plurality of *n* storage positions, one storage position for each data item and the track address thereof, each of said storage positions of the intermediate memory corresponding to a sector position of a track of the principal memory regardless of the address of said track, a first fast access transfer means for randomly transferring data items and the track addresses thereof from the data source into the storage positions of the intermediate memory according to the sector addresses of said data items, second fast access transfer means controlled by the sector address register for recurrently transferring the data items and the track addresses thereof respectively from the storage positions of the intermediate memory which correspond to sector positions of the principal memory, successively spaced apart by *k* sector positions, *k* being an integer smaller than *n* and prime with *n*, into said data register and track address register, third low access transfer means for transferring from the data register into the principal memory said data items according to their track addresses and means for inhibiting said first transfer means during the operation of said second transfer means.

2. In an electrical digital computer including a source of electrical signals representing data items to be operated upon, a principal magnetic drum memory divided into a plurality of tracks and a plurality of *n* sector positions per track, one sector position for each data item, whereby said data items are identified by sector and track addresses, a sector address register, a track address register, a track selector and a data register associated with said principal magnetic drum memory, a fast access data transfer system, said system comprising an intermediate, fast access memory divided into a plurality of *n* storage positions, one storage position for each data item and the track address thereof, each of said storage positions of the intermediate memory corresponding to a sector position of a track of the principal memory regardless of the address of said track, a first fast access transfer means for randomly transferring data items and the track addresses thereof from the data source into the storage positions of the intermediate memory according to the sector addresses of said data items, second fast access transfer means controlled by the sector address register for recurrently transferring the data items and the track addresses thereof respectively from the storage positions of the intermediate memory which correspond to sector positions of the principal memory successively spaced apart by *k* sector positions, *k* being an integer smaller than *n* and prime with *n*, into said data register and track address register, means for positioning said track selector according to the track address transferred into said track address register, third low access transfer means for transferring from the data register through the positioned track selector into the principal memory said data items and means for inhibiting said first transfer means during the operation of said second transfer means.

3. In an electrical digital computer including a source of electrical signals representing data items to be operated upon, a principal magnetic drum memory divided into a plurality of tracks and a plurality of *n* sector positions per track, one sector position for each data item, whereby said data items are identified by sector and track addresses, a sector address register, a track address register, a data register and a write-in and read-out instruction register associated with said principal magnetic drum memory, a fast access data transfer system, said system comprising an intermediate fast access memory divided into a plurality of *n* storage positions, one storage position for each data item, the track address thereof and the instruction applying thereto, each of said storage postions of the intermediate memory corresponding to a sector position of a track of the principal memory regardless of the address of said track, a first fast access transfer means for randomly transferring data items, the track addresses thereof and the instructions applying thereto from the data source into the storage positions of the intermediate memory according to the sector addresses of said data items, second fast access transfer means controlled by the sector address register for recurrently transferring the data items, the track addresses thereof and the instructions applying thereto respectively from the storage positions of the intermediate memory which correspond to sector positions of the principal memory successively spaced apart by $k$ sector positions, $k$ being an integer smaller than $n$ and prime with $n$, into said data register, track address register and instruction register, third low access transfer means for transferring between the data register and the principal memory said data items according to the track addresses thereof and in a direction corresponding to the instruction applying to said data items and means for inhibiting said first transfer means during the operation of said second transfer means.

References Cited

UNITED STATES PATENTS 3,028,583 4/1962 Fernekees et al. ---- 340—172.5

ROBERT C. BAILEY, *Primary Examiner.*

O. E. TODD, *Assistant Examiner.*